United States Patent Office 3,037,301
Patented June 5, 1962

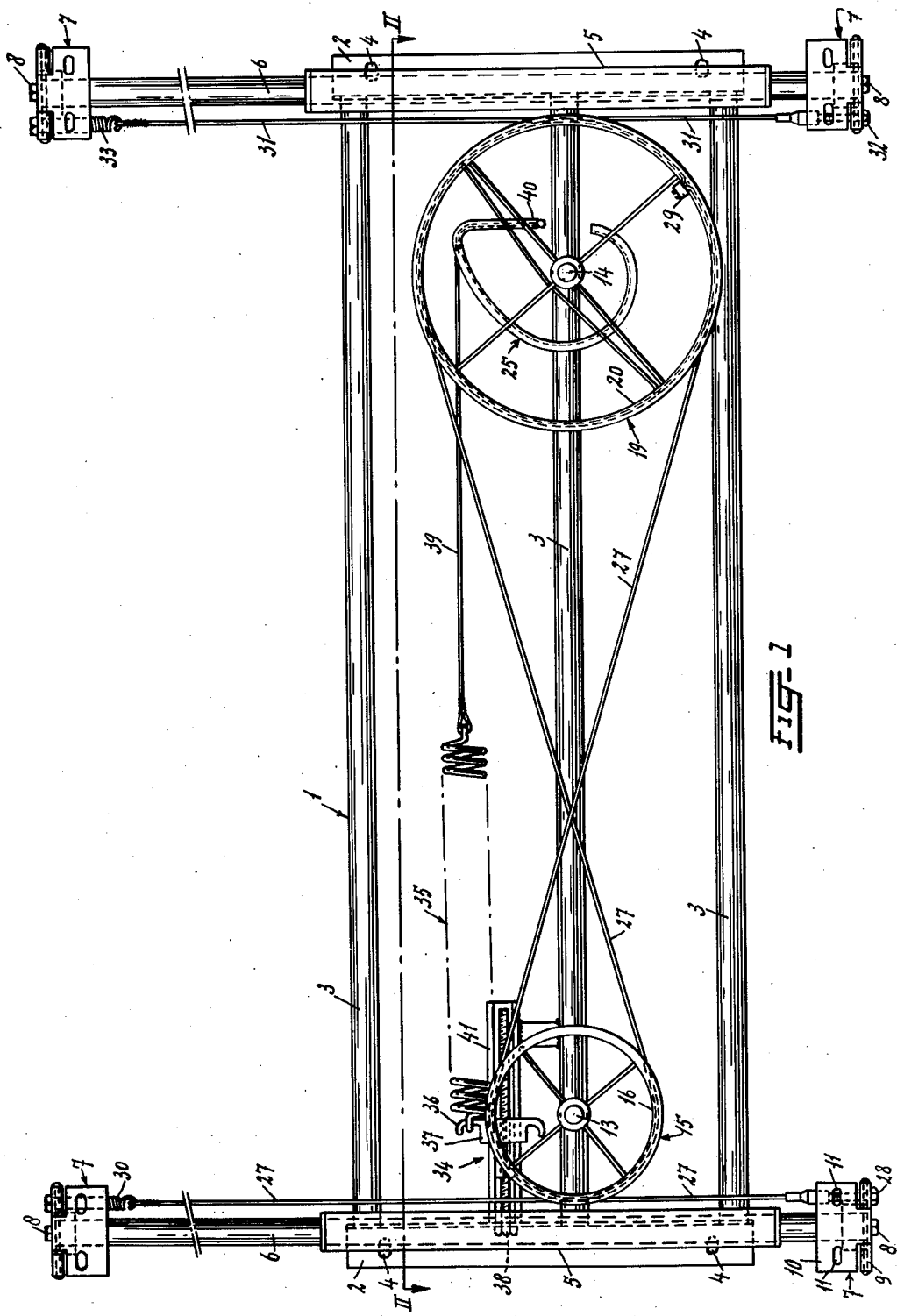

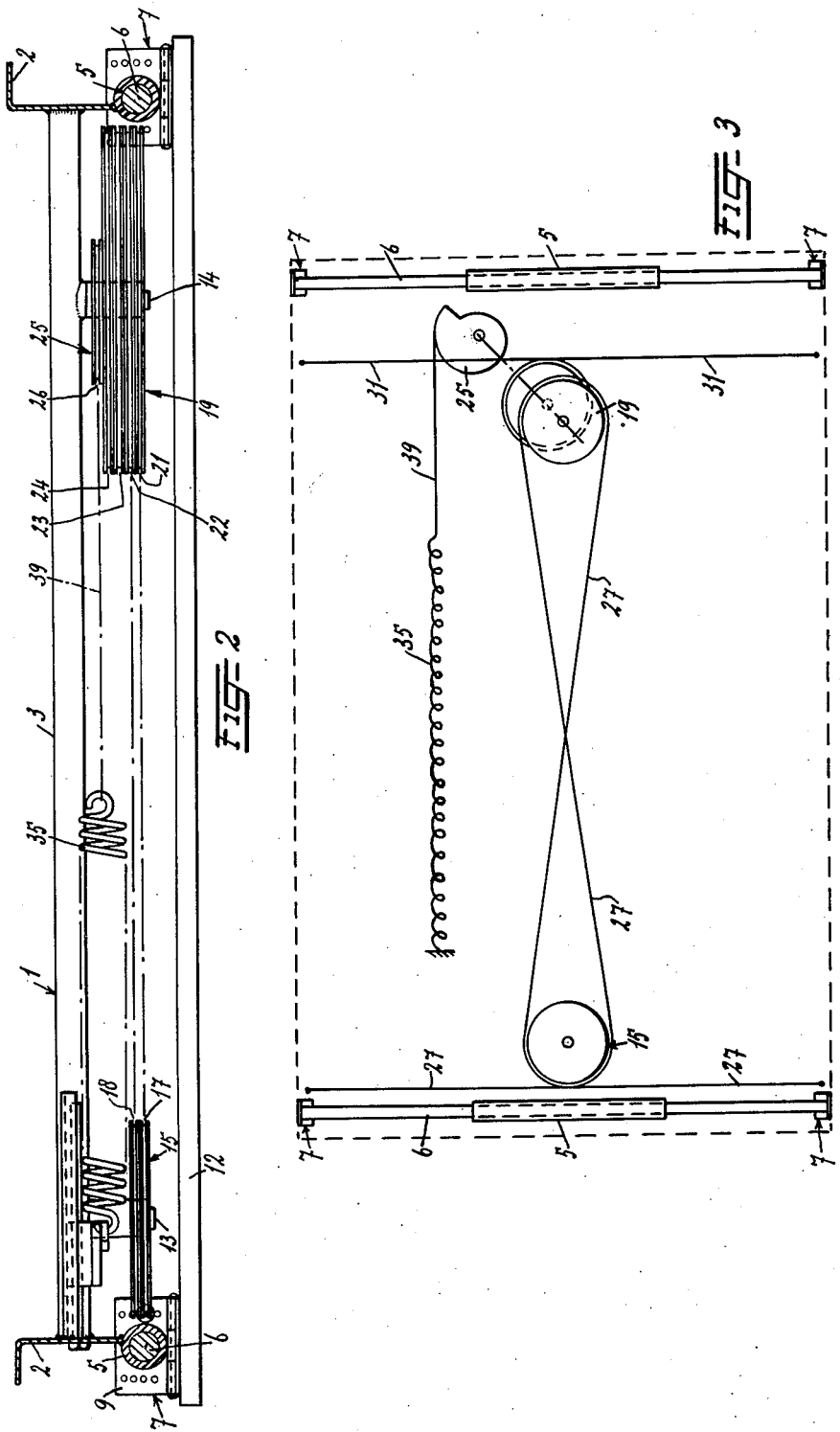

3,037,301
CHALKBOARD
Tebbe Jan Siepel, Veendam, Netherlands, assignor to Marko Fabrieken voor Metaalbewerking N.V., Veendam, Netherlands, a Dutch company
Filed Jan. 5, 1961, Ser. No. 80,765
12 Claims. (Cl. 35—63)

The invention relates to chalkboards, and more in particular to means for balancing a vertically displaceable chalkboard.

Up to now, it has been usual to balance a chalkboard by means of two ropes attached to the chalkboard on each side thereof, each led over a rotatable pulley, and each carrying a counterweight at its free end.

It is an object of the invention to provide a novel arrangement for balancing a chalkboard, wherein the counterweights may be omitted.

Another object of the invention is to provide an arrangement for balancing a chalkboard, wherein the balancing action is exerted by at least one spring.

Still another object of the invention is to provide an arrangement, wherein a chalkboard is balanced by a constant force on each side thereof by means of a single spring.

A further object of the invention is to provide a novel arrangement for balancing a chalkboard, which is easy to produce and to operate.

Further objects and advantages of the invention will appear from the following description, given with reference to the accompanying drawings, wherein FIG. 1 is a front view of an arrangement for balancing a chalkboard according to the invention, from which the chalkboard has been removed;

FIG. 2 is partially a plan view of the same arrangement, and partially a cross section taken along the line II—II in FIG. 1;

FIG. 3 is a schematic representation of the arrangement shown in FIGS. 1 and 2, given in order to facilitate the understanding of the operation of the mechanism.

The arrangement as shown in the drawings comprises a frame 1, adapted to be fixedly attached to the wall of a class room, and consisting of two vertical members 2 having an L-shaped cross section, and three horizontal tubular members 3 interconnecting the vertical members 2. One of the legs of each L-shaped member 2 is provided with slots 4, adapted to receive screws, bolts or similar fastening members, by means of which the frame 1 is attached to the wall (not shown). The other leg of each L-shaped member is welded to a vertical guide tube 5.

A guide rod 6 is slidable in each of the guide tubes 5. The guide rods 6 are of equal length, and are each provided at both ends with fastening members 7 for the chalkboard 12. Each of the fastening members 7 is formed as a hinge, of which one part 9 is attached to the end surface of the associated rod 6 by means of a bolt 8, and the other part 10 is bent through 90°, and provided with slots 11, adapted to receive screws or bolts for securing the chalkboard 12, in such manner that each of its corners is placed against one of the hinge parts 10 (FIG. 2).

The middle horizontal tube 3 of the frame 1 carries two horizontal shafts 13 and 14. A pulley 15, rotatably mounted on shaft 13, has a rim 16 provided with two separate grooves 17 and 18, each adapted to receive a rope. The grooves 17 and 18 are circular and concentric with shaft 13. A pulley 19, rotatably mounted on shaft 14, has a rim 20 provided with four separate grooves 21, 22, 23, and 24, each adapted to receive a rope; these grooves are likewise circular, and concentric with shaft 14. A cam member 25, having a variable radius and provided with a groove 26, is integral with pulley 19.

One of the ends of a steel rope 27 is attached to the fastening member 7 at the lower end of the left-hand guide rod 6 by means of a twin buckle and a bolt 28. Rope 27 is led over the top of pulley 15 through groove 17, and over the bottom of pulley 19 through groove 21. The rope then passes through a hole in the bottom of groove 21, and a clamping member 29, and enters into groove 22 through a similar hole in its bottom. From there, rope 27 is led over the top of pulley 19 through groove 22, over the bottom of pulley 15 through groove 18, and finally upwards to the top end of the left-hand guide rod 6, where the other end of the rope is attached to the fastening member 7 through a tension spring 30.

One of the ends of a second rope 31 is attached to the fastening member 7 at the lower end of the right-hand guide rod 6 by means of a twin buckle and a bolt 32. Rope 31 is led over the top of pulley 19 through groove 23, and passes through a hole in the bottom of groove 23, and a second clamping member 29. The rope then enters into groove 24 through a similar hole in its bottom, and is led over the bottom of pulley 19 through groove 24, and finally upwards to the top end of the right-hand guide rod 6, where the other end of rope 31 is attached to the fastening member 7 through a tension spring 33.

The clamping members 29 serve to prevent the ropes 27 and 31 from sliding through the grooves of pulley 19. Ropes 27 and 31 may be tightened by turning on the bolts 28 and 32. Due to the springs 30 and 33, differences between the lengths of ropes 27 and 31 due to slight irregularities of the construction may be taken up without any appreciable loss of tension.

The middle horizontal tube 3 carries a tightening member 34, to which a helical spring 35 is attached with one of its ends. The said end of spring 35 engages a hook 36 on a slide 37, which is displaceable in a horizontal guide member 41. This guide member is provided with a threaded bore, engaging a screw 38. The other end of spring 35 is attached to one of the ends of a third rope 39, which is led over the top of cam member 25 through groove 26. The remaining end of rope 39 is attached to cam member 25 at 40. By turning on screw 38, slide 37 may be moved to the left, whereby spring 35 is tightened so as to balance the weight of the chalkboard.

Due to the fact that ropes 27 and 31 are led over a common pulley 19, and that any slip of the ropes on this pulley is prevented by the clamping members 29, equal displacements of the two rods 6 in their associated guide tubes 5 are warranted under any circumstances.

The weight of the chalkboard and the parts integral therewith is transferred by the ropes 27 and 31 to pulley 19, so as to exert a constant torque on said pulley in a clockwise direction (as seen in FIG. 1). This torque is counterbalanced by a counterclockwise torque exerted on pulley 19 by the spring 35. As the chalkboard is lowered, pulley 19 rotates in a clockwise direction, so that the spring 35 is stretched, and the force exerted by the same is increased. At the same time, however, the arm of the torque exerted on pulley 19 by spring 35 is diminished due to the decreasing radius of cam member 25. The shape of cam member 25 has been selected in such manner that the torque exerted by spring 35 on pulley 25 is substantially constant, so that the chalkboard is correctly balanced in any position.

Although the invention has been described hereinbefore by reference to a specific embodiment thereof, it is to be understood, that the invention is not restricted to this embodiment, which may be modified in many ways

I claim:

1. In combination, a chalkboard, a first set of vertical guide members, fastening means for attaching each vertical guide member of said first set to said chalkboard, a frame adapted to be attached to a wall, a second set of vertical guide members attached to said frame and each engaging one of the guide members of said first set so as to render said chalkboard vertically displaceable with respect to said frame, a first and a second grooved rope guiding member, both of said latter members being rotatably mounted in said frame and spaced with respect to each other, a first rope having its ends attached to two points on said chalkboard one vertically above the other and looped around said first rope guiding member, a second rope having its ends attached to two points on said chalkboard one vertically above the other, and led around said second rope guiding member and around said first rope guiding member and crossed between the said rope guiding members, tensioning means for varying the tension in said first and second ropes, a circumferentially grooved cam integral with one of the said rope guiding members, a third rope having one of its ends attached to said cam, said cam having a groove on the periphery thereof, said one end of the third rope being led through said groove on the circumference of the cam, and a helical spring attached between said frame and said third rope, the surface of said cam being shaped such that said helical spring exerts a constant torque on the associated rope guiding member.

2. The combination as claimed in claim 1, wherein said frame comprises two vertical members having an L-shaped cross section, three horizontal tubes interconnecting the said vertical members, and a first vertical guide tube connected to one of the legs of one of the said vertical members, a second vertical guide tube connected to one of the legs of the other of the said vertical members and wherein said first set of vertical guide members consists of two guide rods each slidable in one of the said guide tubes.

3. The combination as claimed in claim 1, wherein said cam is integral with said first rope guiding member.

4. The combination as claimed in claim 1, further comprising a tightening member for said helical spring attached to said frame.

5. The combination as claimed in claim 2, wherein the ends of said first rope are respectively attached to the ends of one of the said guide rods, and wherein the ends of said second rope are each attached to one of the ends of the other one of the said guide rods.

6. The combination as claimed in claim 2, wherein each of the fastening means comprises a first part, and a second part hingedly connected with said first part, the ends of the said guide rods being each attached to one of the said first parts, said chalkboard having corners each of which is attached to one of the said second parts.

7. The combination as claimed in claim 3, wherein said first rope guiding member is a pulley rotatably mounted in said frame and having four circumferential rope guiding grooves each provided with a hole in its bottom, two of these grooves being associated with said first rope, and the other two grooves being associated with said second rope, and wherein said first and said second rope each pass from one of the associated grooves to the other one through the holes in the bottoms of these grooves the combination further comprising rope clamping means operatively associated with said pulley.

8. The combination as claimed in claim 4, wherein said tightening member comprises a horizontal guide member provided with a threaded bore, a screw engaging said bore, and a slide displaceable along said horizontal guide member and provided with a hook engaging said helical spring.

9. The combination as claimed in claim 5, wherein the tensioning means comprises a first tension spring inserted between one of the ends of said first rope and the associated guide rod end, and a second tension spring inserted between one of the ends of said second rope and the associated guide rod end.

10. The combination as claimed in claim 7, wherein the rope clamping means comprises clamping members each being arranged between two of the said holes, said first and said second rope being each clamped in one of the said clamping members.

11. The combination as claimed in claim 7, wherein said second rope guiding member is a pulley rotatably mounted in said frame and having two circumferential rope guiding grooves.

12. The combination as claimed in claim 11, wherein said first rope runs from one of the bottom corners of said chalkboard over the top of said first rope guiding member through one of the associated grooves, over the bottom of said first rope guiding member through the other associated groove, and to the corresponding top corner of said chalkboard and wherein said second rope runs from the other bottom corner of said chalkboard over the top of said second rope guiding member through one of its grooves, over the bottom of said first rope guiding member through one of the associated grooves, over the top of said first rope guiding member through the other associated groove, over the bottom of said second rope guiding member through its other groove, and to the other top corner of said chalkboard.

No references cited.